United States Patent
Fukushima et al.

(10) Patent No.: US 12,117,425 B2
(45) Date of Patent: Oct. 15, 2024

(54) GAS CHROMATOGRAPH DEVICE

(71) Applicant: SHIMADZU CORPORAITON, Kyoto (JP)

(72) Inventors: Daiki Fukushima, Kyoto (JP); Shingo Masuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 276 days.

(21) Appl. No.: 17/941,294

(22) Filed: Sep. 9, 2022

(65) Prior Publication Data

US 2023/0152281 A1 May 18, 2023

(30) Foreign Application Priority Data

Nov. 18, 2021 (JP) .................................. 2021-188010

(51) Int. Cl.
*G01N 30/30* (2006.01)
*G01N 30/12* (2006.01)

(52) U.S. Cl.
CPC ............. *G01N 30/30* (2013.01); *G01N 30/12* (2013.01); *G01N 2030/3084* (2013.01)

(58) Field of Classification Search
CPC ................... G01N 30/30; G01N 30/12; G01N 2030/3084; G01N 2030/3046; G01N 30/54; G01N 30/06
See application file for complete search history.

(56) References Cited

U.S. PATENT DOCUMENTS

2011/0100976 A1* 5/2011 Kawana ................. G01N 30/30
219/412

FOREIGN PATENT DOCUMENTS

| JP | H02259561 A | 10/1990 |
| JP | H1183824 A | 3/1999 |
| JP | 2017009459 A | 1/2017 |

OTHER PUBLICATIONS

Office Action dated Apr. 22, 2024, for corresponding application No. CN 202211256903.7.
Office Action issued for corresponding Chinese patent application No. 202211256903.7, dated Aug. 6, 2024.

* cited by examiner

*Primary Examiner* — Xin Y Zhong
(74) *Attorney, Agent, or Firm* — Muir Patent Law, PLLC

(57) ABSTRACT

Provided is a gas chromatograph device capable of appropriately determining that a temperature of an entirety of a heating target has stabilized after cooling the heating target in a column oven to a target temperature after a temperature-rising analysis. A gas chromatograph device capable of performing a temperature-rising analysis cools an inside of a column oven by a cooling mechanism. When a detection temperature by a temperature sensor for detecting a temperature of the heating target has reached a target temperature after the inside of the column oven has been cooled, the heating target is heated by a heater. Upon reaching of the detection temperature of the temperature sensor to the target temperature, it is determined whether or not the temperature of the entirety of the heating target has stabilized based on power consumption of the heater.

6 Claims, 6 Drawing Sheets

GAS CHROMATOGRAPH DEVICE

CROSS-REFERENCE TO RELATED APPLICATIONS

This application claims priority under 35 U.S.C. § 119 to Japanese Patent Application No. 2021-188010 filed on Nov. 18, 2021, the entire disclosure of which is incorporated herein by reference in its entirety.

BACKGROUND OF THE INVENTION

Field of the Invention

The present invention relates to a gas chromatograph device.

Description of the Related Application

For example, in a gas chromatograph device as described in Patent Document 1 listed below, it is possible to perform a temperature-rising analysis by introducing a sample from a sample vaporization chamber into a column and detecting the sample components separated by the column while increasing the temperature of the column within a column oven.

PRIOR ART DOCUMENT

Patent Document

Patent Document 1: Japanese Unexamined Patent Application Publication No. 2017-009459

SUMMARY OF THE INVENTION

Problems to be Solved by the Invention

In the above-described gas chromatograph device, it is also possible to repeatedly perform a temperature-rising analysis. In this case, after the temperature-rising analysis, a heating target in the column oven is cooled to a target temperature, and then the following temperature-rising analysis is performed while heating the heating target in the column oven again after the equilibration time has elapsed. One exemplary heating target includes, for example, a column and a sample introduction unit. The equilibration time denotes a wait time until the temperature is equilibrated and can be set as a parameter in advance by a user.

In a case where the equilibration time is set to be shorter than an appropriate time, a good analysis result may not be obtained because the next temperature-rising analysis is started prior to the temperature of the entire heating target has stabilized.

Further, in a case where the equilibration time is set to be longer than an appropriate time, the time to complete the repeated temperature-rising analyses will be wastefully long.

The present invention has been made in view of the above-described circumstances. It is an object of the present invention to provide a gas chromatograph device capable of appropriately determining that a temperature of an entire heating target has stabilized after cooling the heating target in a column oven to a target temperature after a temperature-rising analysis.

Means for Solving the Problem

One aspect of the present invention relates to a gas chromatograph device capable of performing a temperature-rising analysis in which a sample is introduced from a sample introduction unit to a column to detect sample components separated by the column while raising a temperature of the column in a column oven. The gas chromatograph device is provided with a heater, a cooling mechanism, a temperature sensor, a temperature control unit, and a determination processing unit. The heater is configured to heat a heating target in the column oven. The cooling mechanism is configured to cool the inside of the column oven. The temperature sensor is configured to detect a temperature of the heating target. The temperature control unit is configured to cool an inside of the column oven using the cooling mechanism upon completion of the temperature-rising analysis and heat the heating target using the heater upon reaching of a detection temperature of the temperature sensor to a target temperature. The determination processing unit is configured to determine whether or not a temperature of an entirety of the heating target has stabilized based on power consumption of the heater upon reaching of the detection temperature of the temperature sensor to the target temperature.

Effects of the Invention

According to the present invention, it is possible to appropriately determine that the temperature of the entire heating target has stabilized after cooling the heating target in the column oven to a target temperature after a temperature-rising analysis.

BRIEF DESCRIPTION OF THE DRAWINGS

The preferred embodiments of the present invention are shown by way of example, and not limitation, in the accompanying figures.

EMBODIMENTS FOR CARRYING OUT THE INVENTION

In the following paragraphs, some preferred embodiments of the invention will be described by way of example and not limitation. It should be understood based on this disclosure that various other modifications can be made by those in the art based on these illustrated embodiments.

1. Configuration of Gas Chromatograph Device

Figure 1:
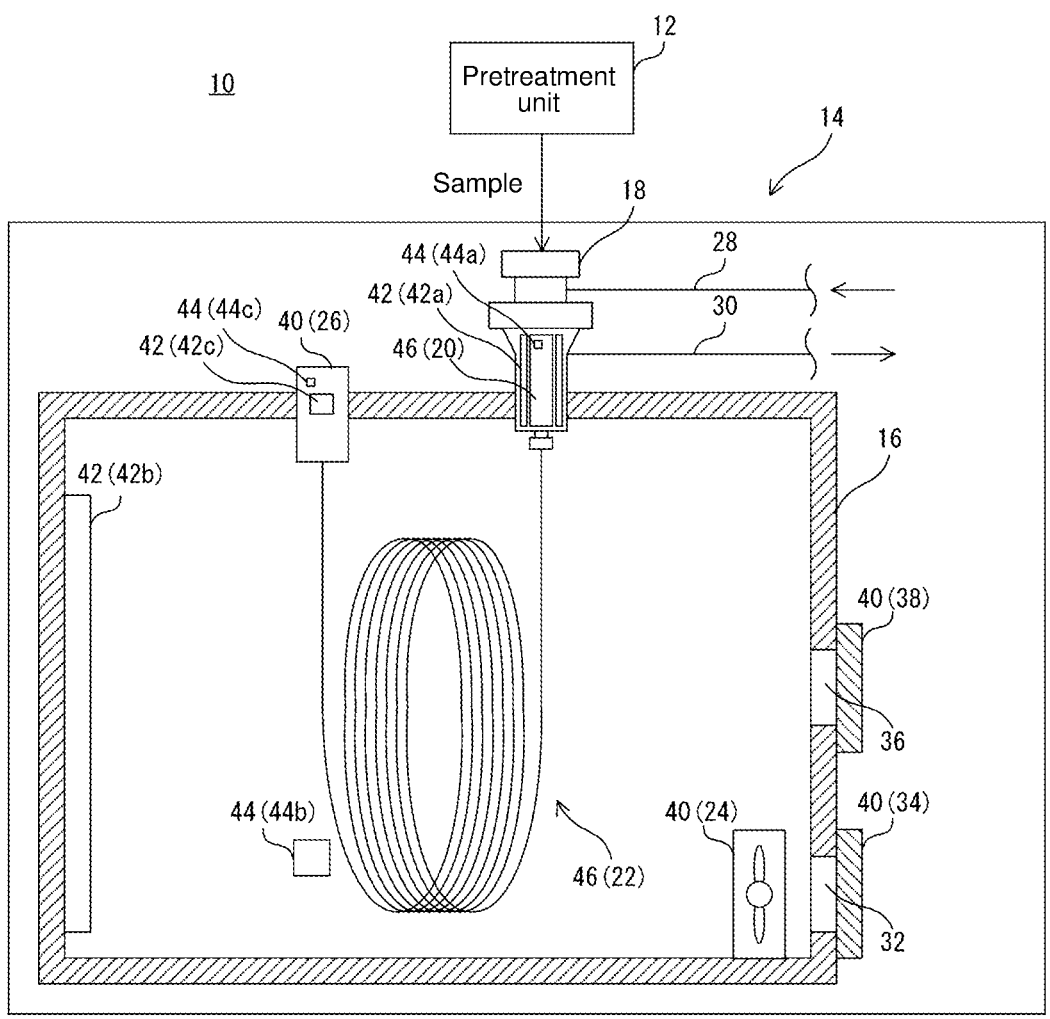
FIG. 1 is a schematic diagram illustrating one example of a configuration of a gas chromatograph device according to an embodiment of the present invention.

FIG. 1 is a schematic diagram illustrating one example of the configuration of a gas chromatograph device 10 according to this embodiment. The gas chromatograph device 10 includes a pretreatment unit 12 and a gas chromatograph unit 14. The pretreatment unit 12 and the gas chromatograph unit 14 are communicatively connected.

For example, the pretreatment unit 12 and the gas chromatograph unit 14 may be communicatively connected to each other in a wired manner, such as, e.g., by a cable, or may be communicatively connected by a short-range wireless communication, such as, e.g., an infrared communication or Bluetooth (registered mark).

The pretreatment unit 12 includes an automated sample injector (not shown) for automatically injecting a liquid sample in a sample container into the gas chromatograph unit 14 while holding a plurality of sample containers. In addition, in the pretreatment unit 12, a plurality of reagent containers can be held. The pretreatment unit 12 is capable of pretreating a liquid sample using a liquid reagent in a reagent container and then injecting the pretreated liquid sample into the gas chromatograph unit 14.

In the pretreatment unit 12, a liquid can be sucked and injected via a needle. In the pretreatment unit 12, a pretreated liquid sample can be sucked through the needle, and the liquid sample thereof can be injected into a sample vaporization chamber 20 in a sample introduction unit 18 (which will be described later) of the gas chromatograph unit 14. In other words, the pretreatment unit 12 can perform a pretreatment to a liquid sample and supply the pretreated liquid sample to the sample vaporization chamber 20 in the sample introduction unit 18.

The gas chromatograph unit 14 is provided with a column oven 16, a sample introduction unit 18, a column 22, a fan 24, a detector 26, and the like, which are accommodated in a housing.

In the temperature-controllable column oven 16, the sample introduction unit 18, the column 22, the fan 24, the detector 26, and the like are provided. Specifically, as for the sample introduction unit 18 and the detector 26, the part thereof is provided in the column oven 16.

The sample introduction unit 18 is a sample introduction unit (SPL) for introducing a carrier gas and a sample gas into the column 22 and is provided with a septum (not shown). Further, a sample vaporization chamber 20 is formed inside the sample introduction unit 18. As for the sample vaporization chamber 20, it is provided in the column oven 16 in the same manner as in the sample introduction unit 18.

Further, the sample introduction unit 18 is provided with the heater 42. Specifically, a first heater 42a included in the heater 42 is provided in the sample introduction unit 18. The first heater 42a heats the sample introduction unit 18. Therefore, the liquid sample injected into the sample vaporization chamber 20 is vaporized by the heat from the first heater 42a.

Further, the sample introduction unit 18 is provided with a temperature sensor 44. Specifically, a first temperature sensor 44a included in the temperature sensor 44 is provided in the sample introduction unit 18. The temperature of the sample introduction unit 18 is detected by the first temperature sensor 44a.

The sample vaporization chamber 20 is in communication with a gas supply flow path 28 and a split flow path 30. The gas supply flow path 28 is a flow path for supplying a carrier gas into the sample vaporization chamber 20 of the sample introduction unit 18.

The split flow path 30 is a flow path for discharging a part of the gas (a mixed gas of a carrier gas and a sample gas) in the sample vaporization chamber 20 to the outside at a predetermined split rate when introducing the carrier gas and the vaporized liquid sample (sample gas) into the column 22 by a split introduction method.

With the above-described configuration, according to the sample introduction unit 18, the sample gas is introduced into the column 22 together with the carrier gas.

Further, in the column oven 16, the heater 42 is provided. Specifically, a second heater 42b included in the heater 42 is provided in the column oven 16. The second heater 42b heats the column 22.

Specifically, in accordance with the heat generation of the second heater 42b, the fan 24 is rotated. Therefore, the air heated by the second heater 42b circulates in the column oven 16. With this, the column 22 is heated.

Further, a temperature sensor 44 is provided in the column oven 16. Specifically, a second temperature sensor 44b included in the temperature sensor 44 is provided in the column oven 16. The second temperature sensor 44b detects the temperature of the column 22.

When the sample gas is introduced into the heated column 22, the sample components contained in the sample gas are separated by components. Note that the column 22 is a general-purpose column, such as, e.g., a capillary column.

The detector 26 is provided for sequentially detecting various components separated by the column 22. The detector 26 is configured by, for example, a hydrogen flame ionization detector (FID).

Further, the detector 26 is provided with a heater 42. Specifically, a third heater 42c included in the heater 42 is provided on the detector 26. The third heater 42c heats the detector 26.

Further, the detector 26 is provided with a temperature sensor 44. Specifically, a third temperature sensor 44c included in the temperature sensor 44 is provided on the detector 26. The third temperature sensor 44c detects the temperature of the detector 26.

Further, the column oven 16 is provided with an air inlet flap 34 for opening and closing an air inlet port 32 and an air outlet flap 38 for opening and closing an air outlet port 36. When heating the column 22, the air inlet flap 34 and the air outlet flap 38 are closed.

On the other hand, when cooling the inside of the column oven 16, the air inlet flap 34 and the air outlet flap 38 are opened from the closed state. The fan 24 is always rotating, and when cooling the inside of the column oven 16, the air taken in from the air inlet port 32 deprives the heat in the column oven 16. The heat-deprived air in the column oven 16 is discharged from the air outlet port 36.

From these, it can be said that the fan 24, the air inlet flap 34, and the air outlet flap 38 serve as a cooling mechanism 40 for cooling the inside of the column oven 16.

According to such a gas chromatograph device 10, it is possible to perform a temperature-rising analysis which is an analysis in which a sample gas is introduced into the column 22 and the sample components separated by the column 22 are detected by the detector 26 while increasing the temperature of the column 22 in the column oven 16.

Further, the heater 42 can heat the heating target 46 in the column oven 16. Furthermore, the temperature sensors 44 can detect the temperature of the heating target 46 in the column oven 16.

In this embodiment, the heating target 46 includes at least one of the sample introduction unit 18, the column 22, and the detector 26. In the embodiment illustrated in FIG. 2, the sample introduction unit 18, the column 22, and the detector 26 are all included in the heating target 46. However, it should be noted that the heating target 46 is not limited to the sample introduction unit 18, the column 22, or the detector 26.

2. Electrical Configuration of Gas Chromatograph Device

Figure 2:
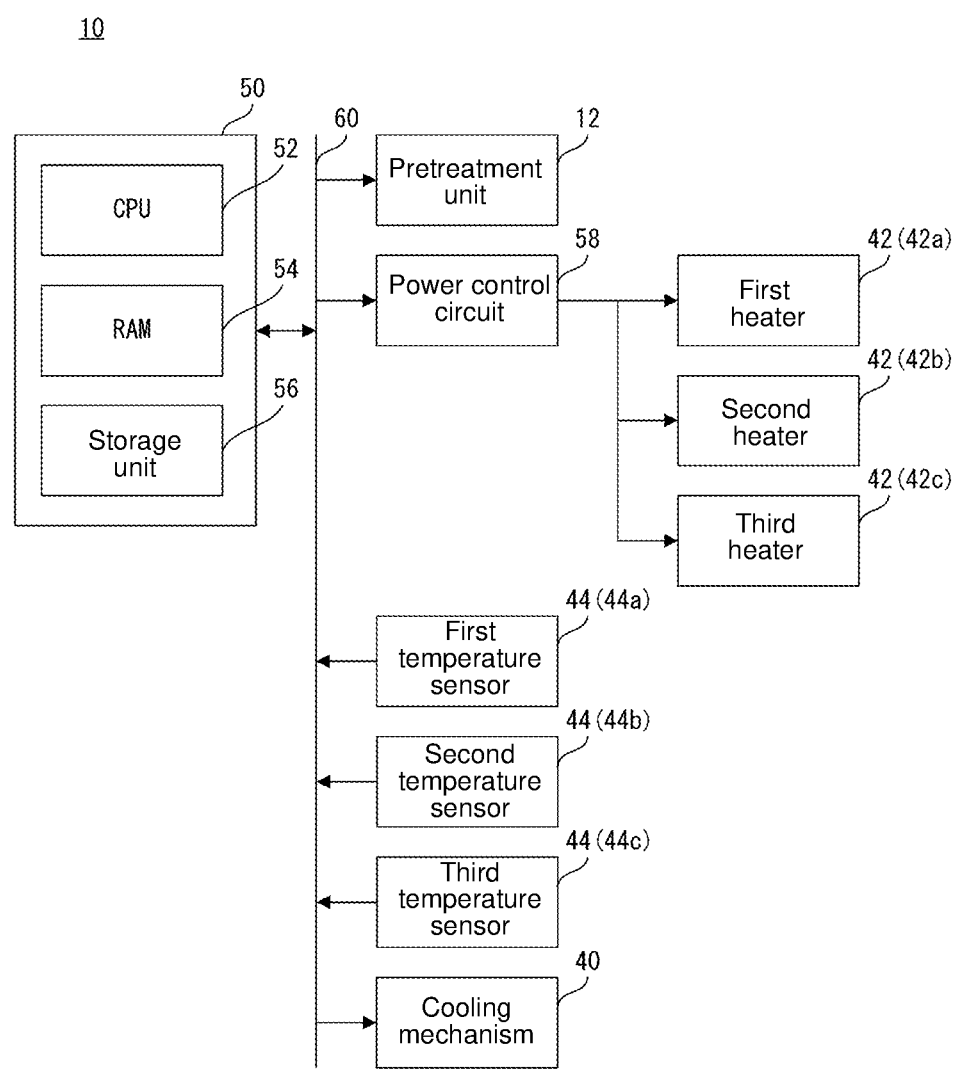
FIG. 2 is a block diagram illustrating one example of an electric configuration of the gas chromatograph device according to the embodiment.

FIG. 2 is a block diagram showing one example of an electrical configuration of the gas chromatograph device 10 of this embodiment. As shown in FIG. 2, the gas chromatograph device 10 is provided, in addition to the cooling mechanism 40 and the like, with a control unit 50, a power control circuit 58, and the like.

Further, the control unit 50, the pretreatment unit 12, the power control circuit 58, the first temperature sensor 44*a*, the second temperature sensor 44*b*, the third temperature sensor 44*c*, and the cooling mechanism 40 are electrically connected to each other via a circuit 60, such as, e.g., a bus. Further, the power control circuit 58 is connected to the first heater 42*a*, the second heater 42*b*, and the third heater 42*c*.

The control unit 50 is responsible for the overall control of the gas chromatograph device 10. The control unit 50 is provided with a CPU (Central Processing Unit) 52. The control unit 50 is provided with a RAM (Random Access Memory) 54 and a storage unit 56 to which the CPU 52 is directly accessible.

The CPU 52 controls each component of the gas chromatograph device 10. The RAM 54 is used as a work area and a buffer area of the CPU 52. The storage unit 56 is a non-volatile memory. For example, an HDD (Hard Disc Drive) or an SSD (Solid State Drive) is used as the storage unit 56.

The storage unit 56 stores control programs for controlling each component of the gas chromatograph device 10, data (execution data) required for executing the control programs, and the like. Note that the storage unit 56 may be configured to include the RAM 54.

The power control circuit 58 is a circuit for supplying power to each of the first heater 42*a*, the second heater 42*b*, and the third heater 42*c*. That is, the power control circuit 58 is a circuit for controlling each of the first heater 42*a*, the second heater 42*b*, and the third heater 42*c*.

Although not shown, the gas chromatograph device 10 is provided with an operation accepting unit for accepting an operation from a user and a display unit that is a general-purpose display.

3. Temperature Control of Heating Target

In the gas chromatograph device 10 of this embodiment, the temperature of the heating target 46 is controlled upon completion of the temperature-rising analysis. Hereinafter, the thermal control of the heating target 46 will be described in detail. In this embodiment, cooling processing is executed upon completion of the temperature-rising analysis. In the cooling processing, the inside of the column oven 16 is cooled using the cooling mechanism 40.

According to the cooling processing, the sample introduction unit 18, the column 22, the detector 26, and the like in the column oven 16 are cooled. Further, as for the sample introduction unit 18 and the detector 26, cooling is performed by the outside air of the column oven 16, in addition to the cooling mechanism 40.

Further, in the gas chromatograph device 10 of this embodiment, heating processing is performed after the cooling processing. In the heating processing, upon reaching of the detection temperature of the temperature sensor 44 to a target temperature after the cooling processing, the heating target 46 in the column oven 16 is heated.

Further, upon starting the heating processing, the cooling processing is terminated. That is, the time (cooling time) during which the cooling processing is performed is the time from the completion of the temperature-rising analysis to reaching of the detection temperature of the temperature sensor 44 to the target temperature. In the heating processing, the heater 42 is controlled such that the detection temperature of the temperature sensor 44 is maintained at the target temperature.

In the heating processing, for example, upon reaching of the detection temperature of the first temperature sensor 44*a* to the target temperature, the sample introduction unit 18 in the column oven 16 is heated. The control of the second temperature sensor 44*b* based on the detection temperature of the second heater 42*b* and the control of the third heater 42*c* based on the detection temperature of the third temperature sensor 44*c* are the same as in the case of the first heater 42*a*, and therefore, the following description will be directed only to the control of the first heater 42*a*.

Further, in this embodiment, determination processing is executed along with the thermal control of the heating target 46. In the determination processing, after the initiation of the heating processing, i.e., upon reaching of the detection temperature of the temperature sensor 44 to the target temperature, it is determined whether or not the temperature of the heating target 46 has stabilized based on the power consumption of the heater 42.

In the determination processing, for example, after the initiation of heating the sample introduction unit 18 by the heating processing, it is determined whether or not the temperature of the entire sample introduction unit 18 has stabilized, based on the power consumption of the first heater 42*a*. Note that the entire sample introduction unit 18 denotes a concept including not only the periphery of the first temperature sensor 44*a* but also a position farthest from the first temperature sensor 44*a* in the sample introduction unit 18. This is also applied to the column 22 and the detector 26.

Figure 3:
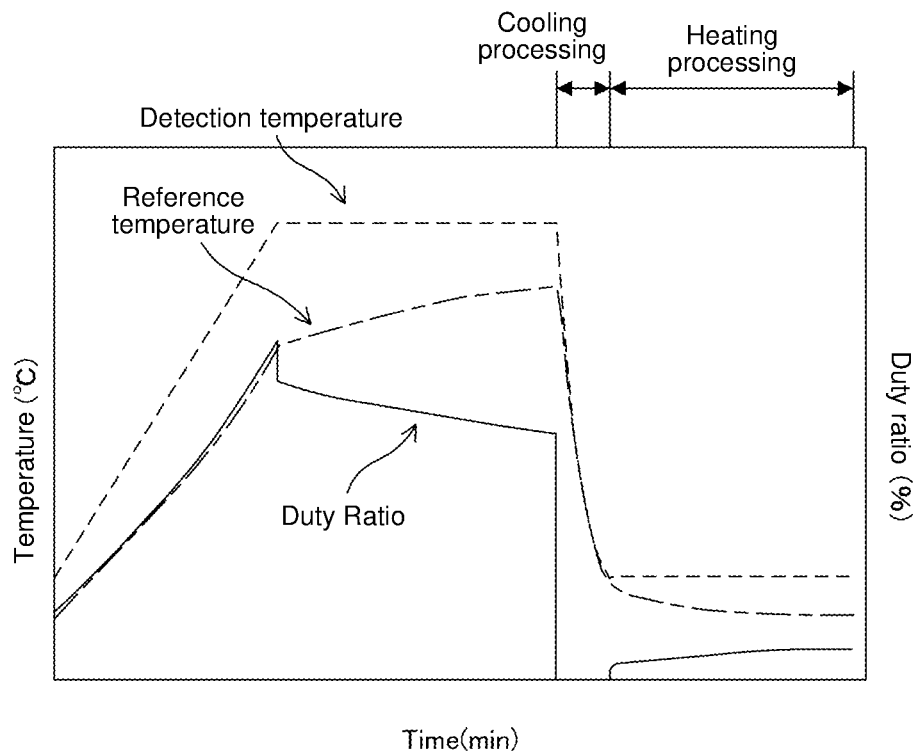
FIG. 3 is one example of a graph for explaining heating processing and cooling processing according to the embodiment.
Figure 4:
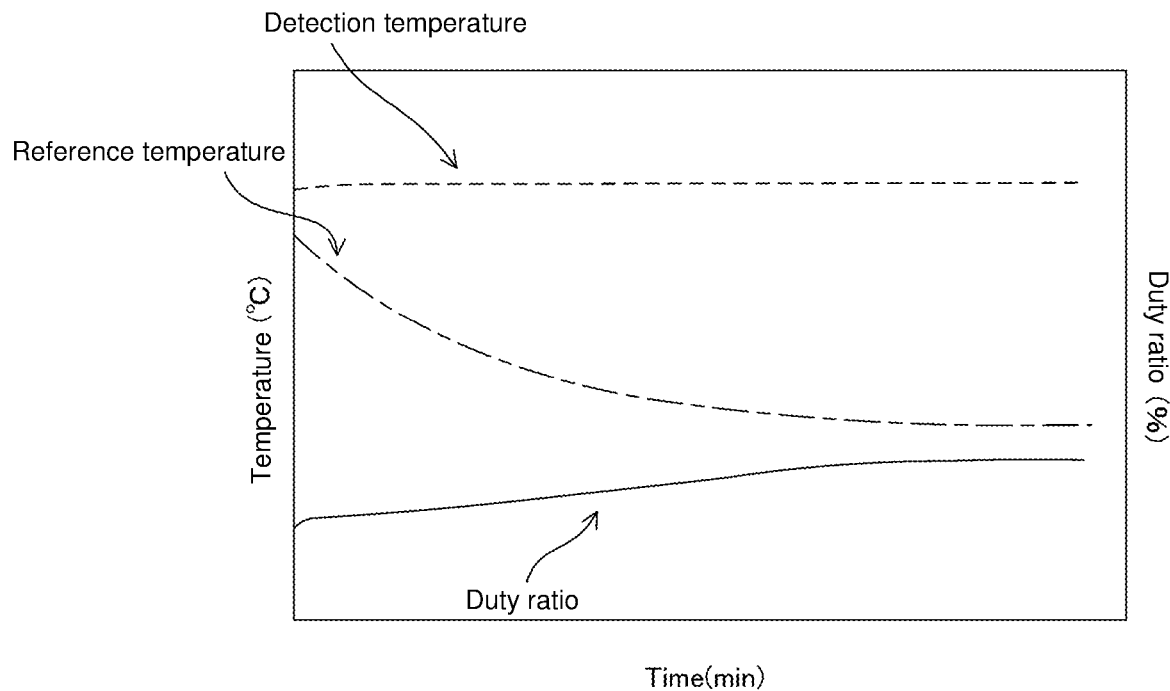
FIG. 4 is one example of a graph for explaining heating processing according to the embodiment.

FIG. 3 is one example of a graph for explaining the heating processing and the cooling processing according to this embodiment. FIG. 4 is one example of a diagram for explaining the heating processing according to this embodiment. FIG. 4 is a partially enlarged view of FIG. 3. FIG. 3 and FIG. 4 show graphs corresponding to the sample introduction unit 18.

In FIGS. 3 and 4, the broken line shows the detection temperature of the first temperature sensor 44*a*. The dashed-dotted line shows the reference temperature. The reference temperature is the temperature of the portion away from the first temperature sensor 44*a* of the sample introduction unit 18. The reference temperature was detected by providing an experimental temperature sensor in addition to the first temperature sensor 44*a*. The solid line shows the duty ratio of the power consumption of the first heater 42*a*.

As shown in FIG. 3, after completion of the temperature-rising analysis, cooling processing and heating processing are performed in this order. The heating processing is started upon reaching of the detection temperature of the first temperature sensor 44*a* to the target temperature. Therefore, immediately after the initiation of the heating processing, the detection temperature of the first temperature sensor 44*a* is the same as the target temperature.

Further, in the heating processing, the first heater 42*a* is controlled such that the detection temperature of the first temperature sensor 44*a* is maintained at the target temperature. Therefore, the temperature (detection temperature) in the vicinity of the first temperature sensor 44*a* of the sample introduction unit 18 is stable.

On the other hand, a large number of metallic members are used in the sample introduction unit 18, and therefore, the temperature of the portion away from the first temperature sensor 44*a* of the sample introduction unit 18 gradually decreases by the outside air or the like of the column oven 16. Therefore, in the embodiment shown in FIGS. 3 and 4, although the detection temperature is maintained at the target temperature, the reference temperature decreases slightly.

Further, in the heating processing, the detection temperature is tried to be maintained to the target temperature while the heat of the sample introduction unit 18 is deprived. Therefore, the duty ratio of the power consumption of the first heater 42*a* increases.

Furthermore, the duty ratio of the power consumption of the first heater 42*a* gradually stabilizes while increasing. This is because the sample introduction unit 18 is heated to such an extent that the entire temperature is stable even when the sample introduction unit 18 is influenced by the outside air outside the column oven 16. Therefore, in the example shown in FIGS. 3 and 4, as the duty ratio of the power consumption of the first heater 42*a* stabilizes, the reference temperature also stabilizes.

Therefore, in the example shown in FIGS. 3 and 4, when the variation of the duty ratio of the power consumption of the first heater 42*a*, specifically, the variation of the duty ratio in a predetermined time, has become equal to or less than a threshold, it can be determined that the temperature of the entire sample introduction unit 18 has stabilized.

Further, these can also be applied to the case of heating the column 22 by the second heater 42*b* or the case of heating the detector 26 by the third heater 42*c*, in the heating processing.

In the above-described example, when the variation of the duty ratio of the power consumption of the heater 42 has become equal to or less than the threshold, it is determined that the temperature of the entire heating target 46 has stabilized. However, when the duty ratio of the power consumption of the heater 42 has become equal to or greater than the threshold, it may be determined that the temperature of the entire heating target 46 has stabilized. Note that the duty ratio of the power consumption of the heater 42 is, for example, a duty ratio of the voltage applied to the heater 42.

Further, for example, in a case where the duty ratio of the power consumption of the heater 42 has become equal to or higher than a first threshold and that the variation of the duty ratio has become equal to or lower than a second threshold, it may be determined that the temperature of the entire heating target 46 has stabilized.

Furthermore, it may be determined that the temperature of the entire heating target 46 has stabilized simply based on the power consumption of the heater 42 instead of the duty ratio of the power consumption of the heater 42.

The time after the initiation of the heating processing until it is determined that the temperature of the entire heating target 46 has stabilized is the equilibration time in this embodiment. Since it can be determined that the temperature of the entire heating target 46 has stabilized after the temperature-rising analysis as described above, the following temperature-rising analysis can be performed after the temperature of the entire heating target 46 has stabilized. In other words, in the repeated temperature-rising analyses, it is possible to suppress the time required for the repeated temperature-rising analyses from becoming unnecessarily longer while obtaining good analytical results.

In addition, since it is possible to determine whether or note the the temperature of the entire heating target 46 has stabilized, in the case of repeatedly performing the temperature-rising analysis, it is unnecessary to set a parameter, such as, e.g., a equilibration time, in advance, and therefore, unnecessary efforts can be saved.

Further, in a case where there is a plurality of heating targets 46, after the temperature of each of the entire heating targets 46 has stabilized, the following temperature-rising analysis can be performed. For example, in a case where the heating target 46 includes the sample introduction unit 18, the column 22, and the detector 26, particularly good analytical results can be obtained.

Further, in this embodiment, in a case where the temperature-rising analysis is repeatedly performed, the information (stabilization period information) on the stabilization period immediately after the first temperature-rising analysis may be stored in the storage unit 56. The stabilization period denotes a period from the start of the cooling processing, i.e., the start of cooling by the cooling mechanism 40, until it is determined that the temperature of the entire heating target 46 has stabilized. It should be noted that the stabilization period can be said to be the time from the completion of the temperature-rising analysis until it is determined that the temperature of the entire heating target 46 has stabilized.

For example, in a case where the heating target 46 includes the sample introduction unit 18, the column 22, and the detector 26, the stabilization period is the time from when the cooling processing is started until it is determined that the temperatures of the entire sample introduction unit 18, column 22, and detector 26 have stabilized. Compared with the column 22 (capillary column) having a small heat capacity, the sample introduction unit 18 and the detector 26 have a large heat capacity and tend to have a long stabilization period.

In this embodiment, in a case where stabilization period information is stored in the storage unit 56, the start of the pretreatment to the sample for the following temperature-rising analysis is instructed to the pretreatment unit 12 so that the pretreatment to the sample for the following temperature-rising analysis is completed at the timing corresponding to the end timing of the stabilization period. Specifically, the waiting time is calculated by subtracting the time (pretreatment time) required for the pretreatment from the stabilization period (cooling time+equilibration time) stored in the storage unit 56, and the start of the pretreatment to the sample for the next temperature-rising analysis is instructed to the pretreatment unit 12 at a timing at which the waiting time elapses after the start of the cooling processing. With this, at the same time as the timing of the completion of the stabilization period, the following temperature-rising analysis can be started. Note that in a case where the stabilization period information is not stored in the storage unit 56, an instruction to start the pretreatment to the sample for the following temperature-rising analysis is given to the pretreatment unit 12 in the same manner as in a conventional art.

However, the start timing of the following temperature-rising analysis is not limited to the end timing of the stabilization period, and may be performed before or after the end timing. That is, the timing corresponding to the end timing of the stabilization period includes the timing before and after the end timing. Therefore, the timing at which the pretreatment to the sample for the following temperature-rising analysis is completed may be before and after the end timing of the stabilization period.

In the pretreatment unit 12, when the liquid sample is subjected to the pretreatment, as described above, a pretreatment is performed on the liquid sample using a liquid reagent. In a case where the timing at which the temperature-rising analysis to the sample for the following pretreatment is completed is prior to the stabilization period of the end timing, the pretreated liquid sample becomes a state of waiting for the temperature-rising analysis as it is. Thus, the analysis result may be adversely affected.

On the other hand, in a case where the timing of the completion of the pretreatment to the sample for the next pretreatment is after the end timing of the stabilization period, between the temperature-rising analyses, a standby time until the next temperature-rising analysis is started after the end of the stabilization period is required. For this reason, the time required for the following temperature-rising analysis to be repeatedly performed becomes wastefully long.

Therefore, it is preferable that the timing at which the pretreatment to the sample for the following temperature-rising analysis is completed be synchronized with the end timing of the stabilization period.

As described above, by storing the stabilization period information in the storage unit 56, it is possible to complete the pretreatment to the sample for the following temperature-rising analysis at the timing corresponding to the end timing of the stabilization period.

3. Specific Electrical Configuration of Gas Chromatograph Device

Figure 5:
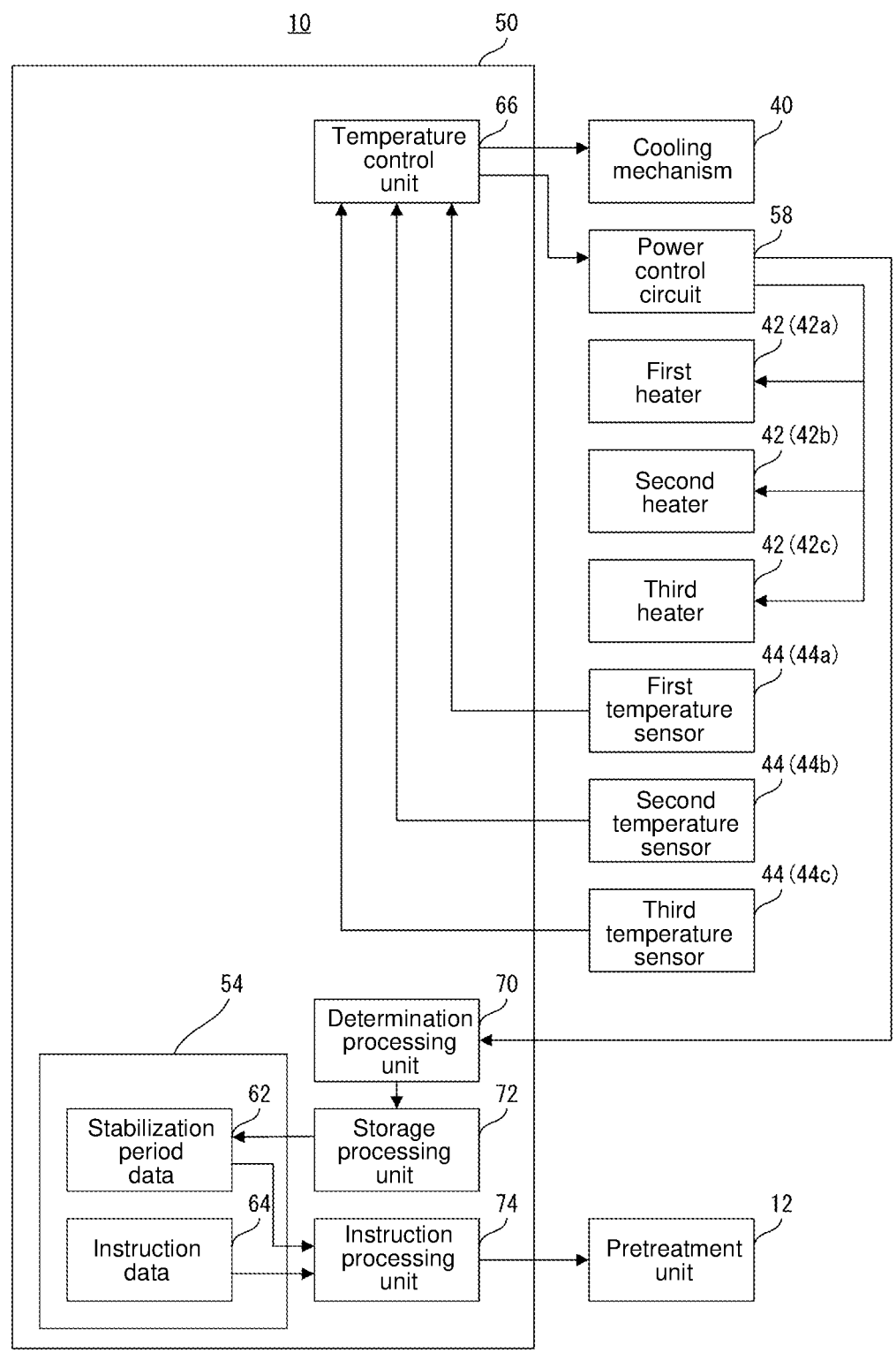
FIG. 5 is a block diagram specifically illustrating an electric configuration of the gas chromatograph device according to the embodiment.

FIG. 5 is a block diagram specifically showing the electrical configuration of the gas chromatograph device 10 of this embodiment. Note that in FIG. 5, the illustration of the storage unit 56 is omitted.

The RAM 54 stores executable data previously read out from the storage unit 56. When storing the acquired data acquired by using a device, a sensor, or the like in the storage unit 56, the acquired data is temporarily stored in the RAM 54.

In the example shown in FIG. 5, the stabilization period data 62 and the instruction data 64 are stored in the RAM 54. Although not shown, the RAM 54 stores the data, etc., required for the control of various components.

The stabilization period data 62 is data corresponding to the stabilization period information. The instruction data 64 is data corresponding to an instruction to be outputted to the pretreatment unit 12.

The RAM 54 stores a control program (not shown) read out in advance from the storage unit 56, and when the CPU 52 executes the control program, the control unit 50 functions as the temperature control unit 66, the determination processing unit 70, the storage processing unit 72, and the instruction processing unit 74.

The temperature control unit 66 cools the inside of the column oven 16 using the cooling mechanism 40 upon completion of the temperature-rising analysis, and heats the heating target 46 using the heater 42 upon reaching of the detection temperature of the temperature sensor 44 to the target temperature. The temperature control by the temperature control unit 66 is performed by a PID (Proportional Integral Differential) control.

Upon reaching of the detection temperature of the temperature sensor 44 to the target temperature, the determination processing unit 70 determines whether or not the temperature of the entire heating target 46 has stabilized based on the power consumption of the heater 42.

In a case where the temperature-rising analysis is repeatedly performed, the storage processing unit 72 stores the stabilization period information on the first temperature-rising analysis as stabilization period data 62.

The instruction processing unit 74 instructs the pretreatment unit 12 to initiate the pretreatment to the sample for the following temperature-rising analysis so that the pretreatment to the sample for the following temperature-rising analysis is completed at the timing corresponding to the end timing of the stabilization period.

4. Flow

Figure 6:
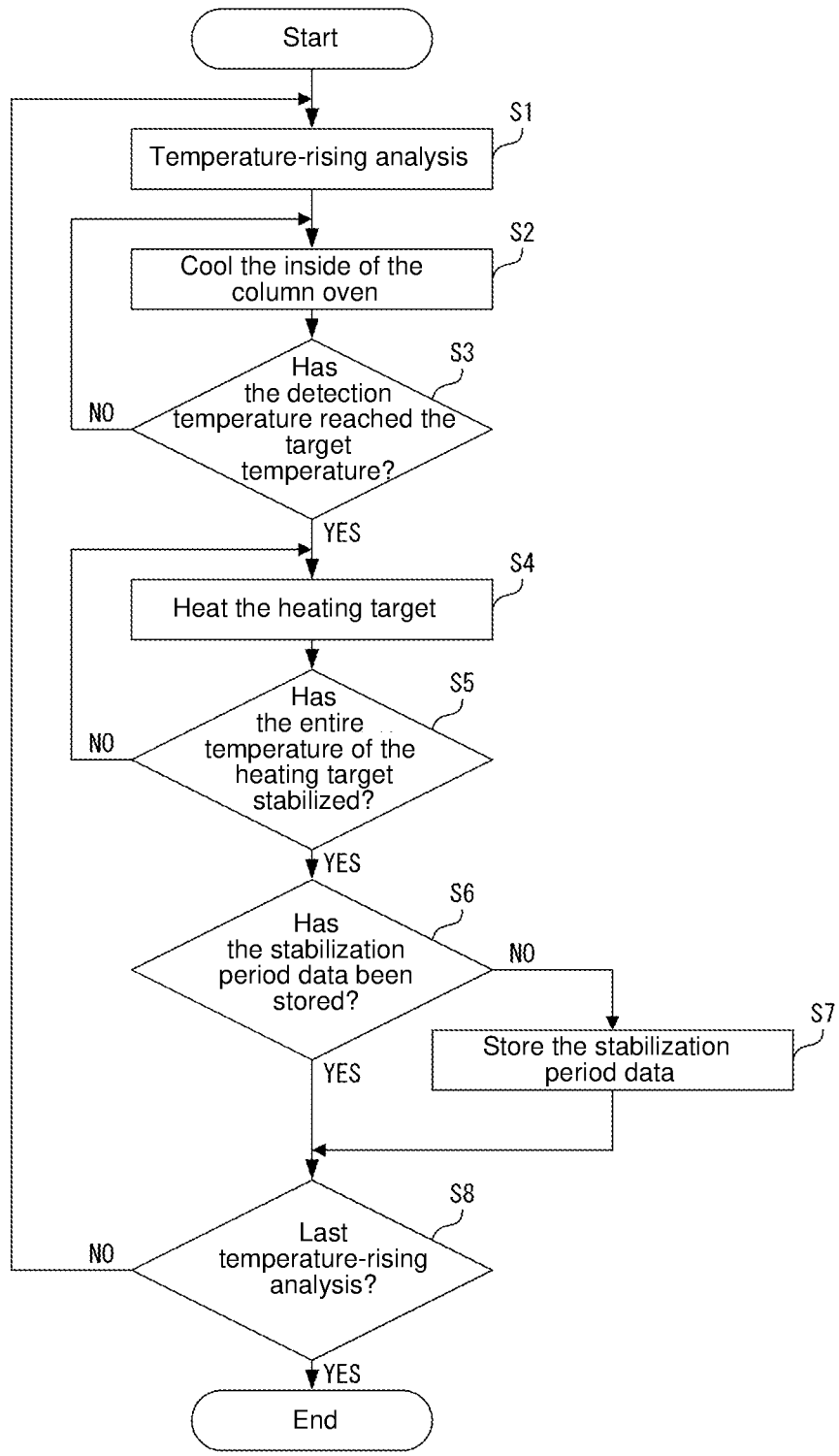
FIG. 6 is a flowchart showing one example of the stabilization processing performed by a CPU according to the embodiment.

FIG. 6 is a flowchart showing one example of temperature-rising analysis processing of the CPU 52 of this embodiment. The temperature-rising analysis processing is initiated, for example, in response to the fact that the gas chromatograph device 10 has accepted an operation for initiating the temperature-rising analysis.

In Step S1, the temperature-rising analysis is performed, and in Step S2, the inside of the column oven 16 is cooled.

In Step S3, it is determined whether or not the detection temperature of the temperature sensor 44 has reached the target temperature. When "NO" in Step S3, that is, when the detection temperature of the temperature sensor 44 has not reached the target temperature, the process returns to Step S2. On the other hand, when "YES" in Step S3, that is, when the detection temperature of the temperature sensor 44 has reached the target temperature, the process proceeds to Step S4.

In Step S4, the heating target 46 in the column oven 16 is heated. In Step S5, based on the power consumption of the heater 42, it is determined whether or not the temperature of the entire heating target 46 has stabilized. When "NO" in Step S5, that is, when the temperature of the entire heating target 46 has not stabilized, the process returns to Step S4. On the other hand, when "YES" in Step S5, that is, when the temperature of the entire heating target 46 has stabilized, the process proceeds to Step S6.

In Step S6, it is determined whether or not the stabilization period data 62 is stored. When "NO" in Step S6, that is, when the stabilization period data 62 is not stored, the stabilization period data 62 is stored in Step S7, and the process proceeds to Step S8. On the other hand, when "YES" in Step S6, that is, when the stabilization period data 62 is stored, the process proceeds to Step S8.

In Step S8, it is determined whether or not the temperature-rising analysis is the last one out of the repeated temperature-rising analyses. When "NO" in Step S8, that is, when it is not the last temperature-rising analysis, the process returns to Step S1. On the other hand, when "YES" in Step S8, that is, when it is the last temperature-rising analysis, the temperature-rising analysis process is terminated.

Figure 7:
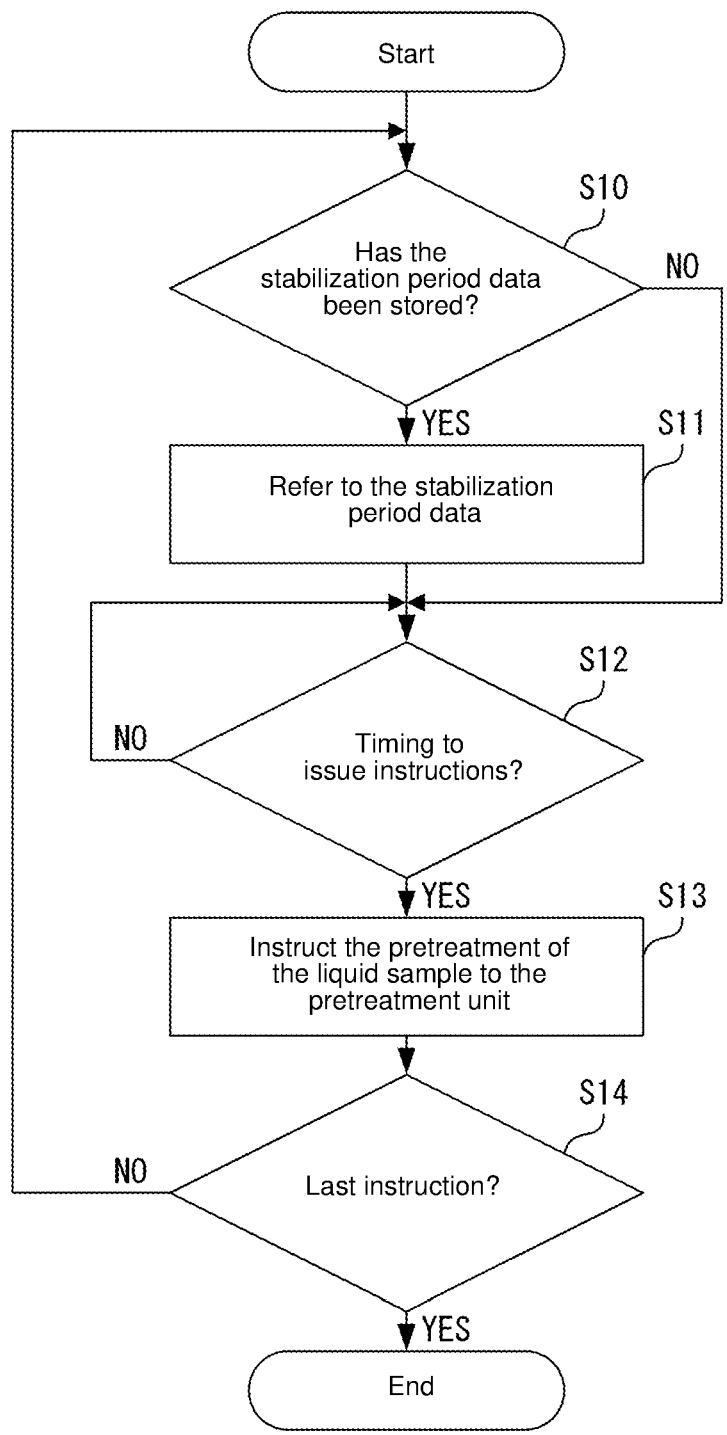
FIG. 7 is a flowchart showing one example of the instruction outputting processing performed by a CPU according to the embodiment.

FIG. 7 is a flowchart showing one example of instruction outputting processing of the CPU 52 of this embodiment. The instruction output processing is initiated, for example, in response to the fact that the gas chromatograph device 10 has received an operation to initiate the temperature-rising analysis In Step S10, it is determined whether or not stabilization period data 62 is stored. When "NO" in Step S10, that is, when stabilization period data 62 is not stored, the process proceeds to Step S12. On the other hand, when "YES" in Step S10, that is, when the stabilization period data 62 is stored, the process proceeds to Step S11.

In Step S11, the stabilization period data 62 is referred to. In Step S12, it is determined whether or not an instruction is issued to the pretreatment unit 12. When "NO" in Step S12, that is, when it is not the timing for issuing an instruction to the pretreatment unit 12, the process returns to Step S12. On the other hand, when "YES" in Step S12, that is, when the timing of issuing an instruction to pretreatment unit 12 is determined, in Step S13, an instruction to perform a pretreatment to the liquid sample is issued to the pretreatment unit 12.

In Step S14, it is determined whether or not the immediately preceding instruction to the pretreatment unit 12 is the last instruction. When "NO" in Step S14, that is, when the immediately preceding instruction to the pretreatment unit 12 is not the last instruction, the process returns to Step S10. On the other hand, when "YES" in Step S14, that is, when the immediately preceding instruction to the pretreatment unit 12 is the last instruction, the instruction outputting processing is terminated.

Note that each Step of the flow diagram shown in the above-described embodiment can be appropriately changed in the order of being processed as long as the same result can be obtained.

In addition, the electric configuration and the like described in the above-described embodiment are merely exemplary and can be appropriately changed in actual products. For example, in this embodiment, a case in which a sample is used as a liquid sample is exemplified, but the form of the sample is not particularly limited as long as the sample can be introduced from the sample introduction unit 18. For example, in a case where a gaseous sample is used as a sample, the pretreatment unit 12 is configured to perform a pretreatment to the gaseous sample and supply the pretreated gaseous sample to the sample introduction unit 18. In addition, in such a case, as the sample introduction unit 18, a sample introduction unit of a type suitable for the gas sample, specifically, a type in which the sample vaporization chamber 20 is not formed, is used.

5. Aspects

It will be understood by those skilled in the art that the plurality of exemplary embodiments described above is illustrative of the following aspects.

(Item 1)

A gas chromatograph device according to a first aspect of the present invention relates to a gas chromatograph device capable of performing a temperature-rising analysis in which a sample is introduced from a sample introduction unit to a column to detect sample components separated by the column while raising a temperature of the column in a column oven. The gas chromatograph device includes:
- a heater configured to heat a heating target in the column oven;
- a cooling mechanism configured to cool an inside of the column oven;
- a temperature sensor configured to detect a temperature of the heating target;
- a temperature control unit configured to cool the inside of the column oven using the cooling mechanism upon completion of the temperature-rising analysis and heat the heating target using the heater upon reaching of a detection temperature of the temperature sensor to a target temperature; and
- a determination processing unit configured to determine whether or not temperature of an entirety of the heating target has stabilized based on power consumption of the heater upon reaching of the detection temperature of the temperature sensor to the target temperature.

According to the gas chromatograph device as recited in the above-described Item 1, after the heating target in the column oven is cooled to the target temperature after the temperature-rising analysis, it is possible to appropriately determine that the temperature of the entire heating target has stabilized based on the power consumption of the heater. As a result, the following temperature-rising analysis can be performed after the entire heating target has stabilized. Further, since the temperature-rising analysis can be performed after the temperature of the entire heating target has stabilized, it is possible to suppress the time required for the repeated temperature-rising analyses from becoming unnecessarily long while obtaining good analytical results in the repeated temperature-rising analyses.

(Item 2)

In the gas chromatograph device as recited in claim 1, it may be further provided with:
- a storage processing unit configured to store information on a stabilization period that is a period from start of cooling by the cooling mechanism until the determination processing unit determines that the temperature of the entirety of the heating target has stabilized.

According to the gas chromatograph device described in the above-described Item 2, information on the stabilization period can be stored. Further, since the information on the stabilization period can be stored, the information can be used for the following temperature-rising analysis.

(Item 3)

In the gas chromatograph device as recited in the above-described Item 2, it may be further provided with:
- a pretreatment unit configured to perform a pretreatment to a sample and supply the pretreated sample to the sample introduction unit; and
- an instruction processing unit configured to instruct start of the pretreatment to a sample for a following temperature-rising analysis to the pretreatment unit so that the pretreatment to the sample for the temperature-rising analysis is completed at an end timing of the stabilization period.

According to the gas chromatograph device as recited in the above-described Item 3, since the pretreatment to the sample for the next temperature-rising analysis is completed at the timing corresponding to the end timing of the stabilization period, it is possible to minimize the waiting time from when the pretreatment to sample is completed until the temperature-rising analysis to the sample is started. Therefore, it is possible to effectively suppress the time required for the repeated temperature-rising analyses from becoming unnecessarily long. Further, since it is possible to suppress the pretreated sample from becoming in a state of waiting for the temperature-rising analysis as it is, a better analytical result can b obtained.

(Item 4)

In the gas chromatograph device as recited in any one of the above-described Items 1 to 3, the determination processing unit may determine that the temperature of the entirety of the heating target has stabilized when a variation of a duty ratio of the power consumption of the heater has become equal to or less than a threshold.

According to the gas chromatograph device as recited in the above-described Item 4, it is possible to appropriately determine that the temperature of the entire heating target has stabilized based on the fact that the variation of the duty ratio of the power consumption of the heater is less than or equal to the threshold.

(Item 5)

In the gas chromatograph device as recited in any one of the above-described Items 1 to 3, the determination processing unit may determine that the temperature of the entirety of the heating target has stabilized when a variation of a duty ratio of the power consumption of the heater has become equal to or larger than a threshold.

According to the gas chromatograph device described in the above-described Item 5, it is possible to appropriately determine that the temperature of the entire heating target has stabilized based on the fact that the duty ratio of the power consumption of heater is equal to or higher than the threshold.

(Item 6)

In the gas chromatograph device as recited in any one of claims 1 to 5, the heating target may include at least one of the sample introduction unit, the column, and the detector According to the gas chromatograph device as recited in the above-described Item 6, it is possible to appropriately determine that, after the temperature-rising analysis, at least one of the sample introduction unit, the column, and the detector has entirely stabilized in the temperature.

The invention claimed is:

1. A gas chromatograph device capable of performing a temperature-rising analysis in which a sample is introduced from a sample introduction unit to a column to detect sample components separated by the column while raising a temperature of the column in a column oven, the gas chromatograph device comprising:
   a heater configured to heat a heating target in the column oven;
   a cooling mechanism configured to cool an inside of the column oven;
   a temperature sensor configured to detect a temperature of the heating target;
   a temperature control unit configured to cool the inside of the column oven using the cooling mechanism upon completion of the temperature-rising analysis and heat the heating target using the heater upon reaching of a detection temperature of the temperature sensor to a target temperature; and
   a determination processing unit configured to determine whether or not a temperature of an entirety of the heating target has stabilized based on power consumption of the heater upon reaching of the detection temperature of the temperature sensor to the target temperature.

2. The gas chromatograph device as recited in claim 1, further comprising:
   a storage processing unit configured to store information on a stabilization period that is a period from start of cooling by the cooling mechanism until the determination processing unit determines that the temperature of the entirety of the heating target has stabilized.

3. The gas chromatograph device as recited in claim 2, further comprising:
   a pretreatment unit configured to perform a pretreatment to a sample and supply the pretreated sample to the sample introduction unit; and
   an instruction processing unit configured to instruct start of the pretreatment to a sample for a following temperature-rising analysis to the pretreatment unit so that the pretreatment to the sample for the temperature-rising analysis is completed at an end timing of the stabilization period.

4. The gas chromatograph device as recited in claim 1, wherein the determination processing unit determines that the temperature of the entirety of the heating target has stabilized when a variation of a duty ratio of the power consumption of the heater has become equal to or less than a threshold.

5. The gas chromatograph device as recited in claim 1, wherein the determination processing unit determines that the temperature of the entirety of the heating target has stabilized when a variation of a duty ratio of the power consumption of the heater has become equal to or larger than a threshold.

6. The gas chromatograph device as recited in claim 1, wherein the heating target includes at least one of the sample introduction unit, the column, and the detector.

* * * * *